May 14, 1935. F. G. TRITT 2,001,594
PARTITIONED HOLLOW RUBBER ARTICLE AND METHOD OF MAKING THE SAME
Filed March 14, 1934
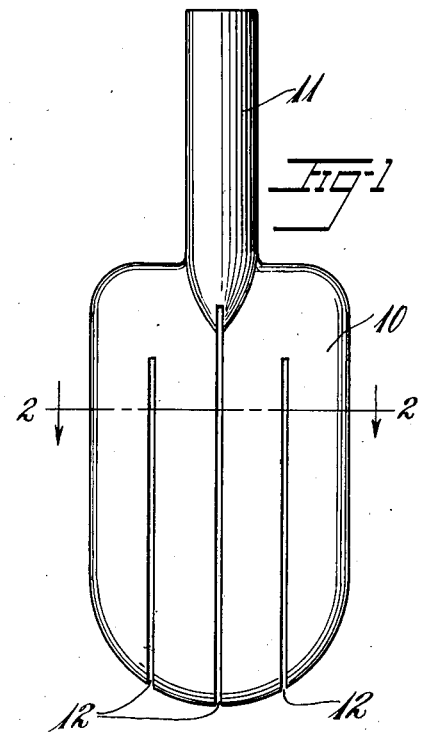
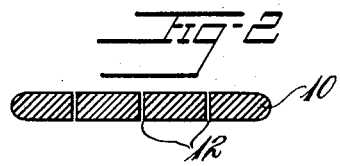
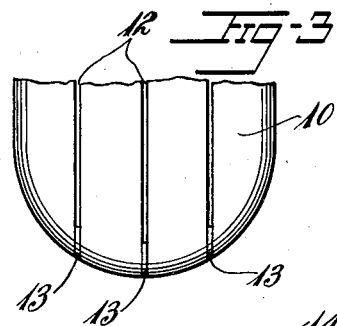
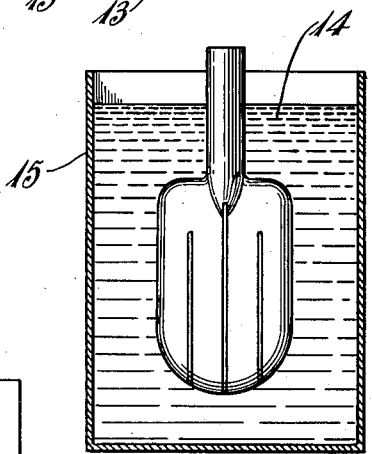
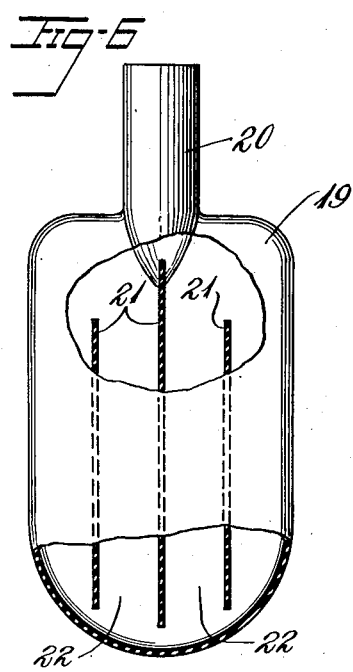
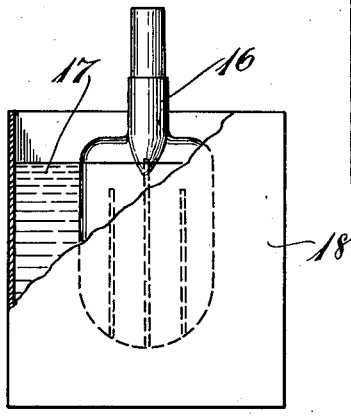
Inventor
Forest G. Tritt
By Eakin & Avery
Attys.

Patented May 14, 1935

2,001,594

UNITED STATES PATENT OFFICE 2,001,594

PARTITIONED HOLLOW RUBBER ARTICLE AND METHOD OF MAKING THE SAME

Forest G. Tritt, Barberton, Ohio, assignor to The B. F. Goodrich Company, New York, N. Y., a corporation of New York Application March 14, 1934, Serial No. 715,483

13 Claims. (Cl. 18—58)

This invention relates to the manufacture of partitioned hollow rubber articles and has as its principal objects the manufacture of a hollow rubber article having one or more integral partitioning webs dividing the interior of the article into a plurality of channels or chambers which communicate at each end of the one or more partitions, and the provision of an economical and efficient method of making such an article. Other objects will be apparent from the following description of the invention in which reference will be had to the accompanying drawing.

In the drawing,

Fig. 1 is an elevation of a slotted form suitable for use in manufacturing an article embodying the present invention.

Fig. 2 is a vertical section taken on line 2—2 of Fig. 1.

Fig. 3 is a fragmentary view of the lower portion of the form of Fig. 1, showing the slots partially filled with a material hereafter to be described.

Fig. 4 is a sectional elevation illustrating a step in the manufacture of an article and showing the form immersed in a liquid dispersion of rubber.

Fig. 5 is a sectional elevation illustrating a further step in the manufacture of a hollow article and showing the form with an associated rubber deposit immersed in a washing tank.

Fig. 6 is an elevation of a finished partitioned hollow rubber article made according to and embodying the features of the present invention, portions of the article being broken away and sectioned for clarity of illustration.

For purposes of illustration, the invention will be described in connection with the manufacture of a partitioned hollow rubber article especially adapted for insertion into a natural body cavity for the purpose of applying heat or cold to the lining of such cavity, the heat or cold being supplied by circulation through the article of water or other fluid at a desired temperature, although the invention is by no means limited to the manufacture of articles for such use. In the manufacture of such an article, a form having the general shape of the article to be made is prepared from any suitable material such as metal, wood, Bakelite, ebonite, glass, porcelain, etc. In the present example, the form may comprise a generally flat and rectangular body 10 having a tubular neck forming portion 11 extending from the center of one of the shorter sides of the rectangular body. The form is provided with a plurality of parallel preferably narrow slots 12 extending from the shorter margin of the body removed from the neck forming portion 11, inward for a substantial distance along lines corresponding to positions at which partitions are desired in the finished hollow article. The slots may be cut in a solid form blank or the slotted form may be provided by assembling separate form portions in a manner which will be understood by a skilled artisan, and the invention, as will appear later, is not limited to the use of any particular method of preparing the slotted form. Next, a portion of any one or all of the slots, and in this example preferably the open end portions thereof, are plugged or filled with disintegrable plugs 13 formed of normally coherent material which may be forced into or molded within the slot and which will maintain its integrity for a considerable time while in contact with an aqueous dispersion of rubber, but which may be disintegrated, as in this example, by solution in water. Pearl glue, which normally is furnished in the form of small pellets, is especially well suited for this purpose, although gum arabic or other similar slowly soluble colloids as well as soap and other materials having like properties may be used. For example, glue pellets may be forced in the open ends of the slots or soap may be placed in the slots and shaped by hand to form plugs filling the end portions of the slots. Thereafter the prepared form is immersed in an aqueous dispersion of rubber 14 such as compounded natural latex, contained in a tank 15 and rubber 16 is deposited within the unfilled portions of the slots and over the form, the deposition being carried out in any of the several well known manners including simple dipping, the use of porous forms with or without suction, the use of coagulants applied either to the form before its association with the aqueous rubber dispersion or to an uncoagulated film of the dispersion on the form, electro-deposition, etc. If the method employed for effecting deposition includes coating the form, prior to its immersion in the aqueous dispersion of rubber, with a water-miscible fluid coagulant composition as by dipping the form in the composition, the fluid composition, particularly if it is somewhat viscous, may be caused to collect in droplets or globules at the lower ends of the slots to serve as plugs when the form is immersed in the aqueous rubber dispersion. If the composition contains a salt dissolved in a volatile solvent, a semi-solid or solid plug may be formed by evaporating all or a portion of the solvent from the droplets to leave the salt which usually is water soluble. To permit stripping of the rubber deposit from the form, the glue or other water soluble plugs in the slots are dissolved in water, preferably by immersing the undried porous deposit together with the form for several hours in circulating wash water 17 in a tank 18 which will serve to remove undesirable water soluble materials from the rubber as well as to dissolve the plugs. Thereafter the rubber is dried, at least partially vulcanized, and stripped from the form. Alternatively, it is of course possible to force water into the interior of the hollow rubber article to dissolve the plugs, but since the rubber is washed in the ordinary manufacturing procedure, and since this washing usually is sufficient to dissolve the plugs, it will ordinarily not be necessary to resort to the alternative of forcing water into the deposit for the purpose of dissolving out the plugs.

In the second embodiment of the invention, a form 10 similar to the one hereinabove described is prepared and the open ends of the slots are filled with plugs 13 comprising normally coherent material having a melting point within the range of temperatures to which rubber may be subjected without injury and which will maintain its integrity while in contact with a liquid dispersion of rubber for a considerable time adequate to permit the production upon the form of a rubber deposit of a desired thickness. Waxes and resins such as paraffin, Japan wax, beeswax, etc., having suitable melting points may be used for this purpose. Thereafter rubber is deposited in the unfilled portions of the slots and over the form in the manner described, and the rubber is dried at a temperature sufficiently high to melt the wax or resin in the slots. After the rubber is dried and preferably at least partially vulcanized, the wax having been melted and in some cases partially or completely absorbed by the rubber, the form is removed from the rubber deposit through the neck opening therein.

Thus, it is seen that I have provided for making a rubber article (Fig. 6) comprising a hollow body 19 having in this particular example, a constricted neck 20, and a plurality of parallel internal partitioning webs 21 which are integrally attached to opposite walls of the body along two separate margins of the web, the end margins of the web being unattached to the body of the article. The webs serve to divide the hollow interior of the article into a plurality of parallel channels or chambers 22 which communicate with each other at the unattached ends of the webs to provide for circulation of fluid throughout the interior of the article and consequent maintenance of a uniform temperature throughout the article which is desirable when it is used for the application of controlled temperatures to body cavities as well as in other instances. Furthermore, the article is structurally integral and exhibits the continuous rubber structure characteristic of articles produced in final form by the deposition of solids from a liquid dispersion of rubber. This exceptionally strong continuous structure permits making the walls and webs considerably thinner than otherwise would be possible without sacrifice of mechanical strength and so provides for efficiency of heat transfer and permits of considerable distension of the article under small internal pressures which is desirable in heat applicators of the type described.

Modifications and variations may be made in details of the invention as hereinabove described without departing from the scope of the invention as defined by the appended claims.

I claim:

1. A partitioned hollow article comprising a shaped hollow body having rubber walls and an internal web of rubber integrally attached along two separated marginal portions thereof to opposed walls of said body to divide the interior of said article into a plurality of chambers communicating with each other at two unattached portions of said web, said walls and said integrally attached web having throughout their extent and at their junctures the characteristic continuous rubber structure resulting from their simultaneous formation in final form from a liquid dispersion of rubber.

2. A partitioned hollow article comprising a shaped hollow body having rubber walls, and a plurality of internal webs of rubber, each integrally attached along two separated marginal portions thereof to opposed walls of said body to divide the interior of said article into a plurality of chambers in excess of two, all of which chambers communicate at each unattached end of the several webs, said walls and said integrally attached webs having throughout their extent and at their juncture the characteristic continuous rubber structure resulting from their simultaneous formation in final form from a liquid dispersion of rubber.

3. A partitioned hollow article comprising a shaped hollow body having rubber walls, and a plurality of parallel internal webs of rubber integrally attached to said walls to divide the interior of said article into a plurality of parallel chambers in excess of two, all of which chambers communicate at each unattached end of the several webs, said walls and said integrally attached webs having throughout their extent and at their junctures the characteristic continuous rubber structure resulting from their simultaneous formation in final form from a liquid dispersion of rubber.

4. The method of making a partitioned hollow rubber article which comprises preparing a form having the shape of the article to be made and having a slot extending from a margin of the form inward along a line corresponding to the position at which a partition is desired in the article, filling a portion of the slot with a disintegrable plug of material which will maintain its integrity for a considerable time while in contact with a liquid dispersion of rubber, introducing a liquid dispersion of rubber into the unfilled portion of the slot and over the surface of the form, solidifying the dispersion to provide a continuous rubber deposit within the slot and upon the form, disintegrating the plug, and removing the form from the article.

5. A method as defined by claim 4 in which the disintegrable plug is formed of material selected from the class consisting of waxes and resins having melting points within the range of temperatures to which rubber may be subjected without injury, and coherent materials soluble in water.

6. A method as defined by claim 4 in which the disintegrable plug is formed of material selected from the class consisting of materials having the properties of paraffin and materials having the properties of glue.

7. The method of making a partitioned hollow rubber article which comprises preparing a form having the shape of the article to be made and having a slot extending from a margin of the position at which a partition is desired in the article, filling a portion of the slot with a normally coherent solid material having a melting point within the range of temperatures to which rubber may be subjected without injury and which will maintain its integrity for a considerable time while in contact with a liquid dispersion of rubber, introducing a liquid dispersion of rubber into the unfilled portion of the slot and over the surface of the form, drying the dispersion to provide a continuous rubber deposit within the slot and upon the form, melting the solid material in the slot, and removing the form from within the article.

8. A method as defined by claim 7 in which the solid material within the slot is melted while the rubber deposit is being dried.

9. A method as defined by claim 7 in which a portion of the slot is filled with a material having the properties of paraffin.

10. The method of making a partitioned hollow rubber article which comprises preparing a form having the shape of the article to be made and having a slot extending from a margin of the form inward along a line corresponding to the position at which a partition is desired in the article, filling a portion of the slot with a disintegrable plug which although soluble in water will maintain its integrity for a considerable time while in contact with an aqueous dispersion of rubber, introducing an aqueous dispersion of rubber into the unfilled portion of the slot and over the surface of the form, coagulating the dispersion to provide a continuous rubber deposit within the slot and upon the form, dissolving the plug in water, and removing the form from within the article.

11. A method as defined by claim 10 in which the dissolving of the plug is effected by continued washing of the rubber deposit, before it is dried, in water.

12. A method as defined by claim 10 in which the plug is formed of material having the properties of glue.

13. A method as defined by claim 10 in which the disintegrable plug consists of a viscous fluid.

FOREST G. TRITT.